United States Patent
Kuenzi

(10) Patent No.: US 11,917,070 B2
(45) Date of Patent: Feb. 27, 2024

(54) METHOD AND SYSTEM FOR MANAGING A MULTIPLICITY OF CREDENTIALS

(71) Applicant: Carrier Corporation, Palm Beach Gardens, FL (US)

(72) Inventor: Adam Kuenzi, Silverton, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 1084 days.

(21) Appl. No.: 16/277,450

(22) Filed: Feb. 15, 2019

(65) Prior Publication Data
US 2019/0260590 A1    Aug. 22, 2019

Related U.S. Application Data

(60) Provisional application No. 62/631,664, filed on Feb. 17, 2018.

(51) Int. Cl.
*H04L 9/32* (2006.01)
*H04W 4/80* (2018.01)
(Continued)

(52) U.S. Cl.
CPC ............ *H04L 9/3234* (2013.01); *G06F 21/34* (2013.01); *G07C 9/00309* (2013.01);
(Continued)

(58) Field of Classification Search
CPC ............ G06F 21/34; G06F 2221/2111; G07C 2009/00507; G07C 2009/00865;
(Continued)

(56) References Cited

U.S. PATENT DOCUMENTS 7,266,687 B2    9/2007    Sowa et al.
7,706,778 B2    4/2010    Lowe
(Continued)

FOREIGN PATENT DOCUMENTS

EP              1536609 B1      3/2009
WO          2017085546 A1      5/2017
(Continued)

OTHER PUBLICATIONS

European Search Report for application 19157648.7, dated Apr. 30, 2019, 8 pages.

*Primary Examiner* — David Bilodeau
(74) *Attorney, Agent, or Firm* — CANTOR COLBURN LLP

(57) ABSTRACT

A wireless key device including a wireless transceiver and antenna configured to communicate with an access terminal, and a processor configured to execute instructions to implement a method of managing digital credentials for a wireless key device. The method includes authenticating the key device with a server, retrieving a plurality of digital credentials from a server, the plurality of digital credentials associated with a plurality of access terminals within a selected geographic proximity to the key device, polling an access terminal of the plurality of access terminals via the wireless transceiver and antenna for an access terminal identification which uniquely identifies the access terminal, identifying a (Continued)

digital credential of the plurality of digital credentials associated with the access terminal based on the access terminal identification, and transmitting the selected digital credential to the access terminal.

19 Claims, 4 Drawing Sheets

(51) Int. Cl.
    *H04W 4/021*     (2018.01)
    *G07C 9/00*     (2020.01)
    *H04L 9/40*     (2022.01)
    *G06F 21/34*     (2013.01)
    *H04W 12/08*     (2021.01)
    *G07C 9/27*     (2020.01)
    *H04W 4/02*     (2018.01)

(52) U.S. Cl.
CPC ........... *G07C 9/00857* (2013.01); *G07C 9/27* (2020.01); *H04L 63/107* (2013.01); *H04W 4/021* (2013.01); *H04W 4/80* (2018.02); *H04W 12/08* (2013.01); *G06F 2221/2111* (2013.01); *G07C 2009/00507* (2013.01); *G07C 2009/00769* (2013.01); *G07C 2009/00865* (2013.01); *G07C 2209/04* (2013.01); *G07C 2209/63* (2013.01); *H04W 4/023* (2013.01)

(58) Field of Classification Search
CPC .. G07C 2209/04; G07C 9/00309; G07C 9/27; H04L 63/107; H04L 9/3234; H04W 12/08; H04W 4/021; H04W 4/023; H04W 4/80

See application file for complete search history.

(56) References Cited

U.S. PATENT DOCUMENTS

| | | |
|---|---|---|
| 8,037,515 B2 | 10/2011 | Lundblade |
| 8,572,699 B2 | 10/2013 | Anand et al. |
| 8,700,729 B2 | 4/2014 | Dua |
| 8,947,200 B2 | 2/2015 | Kuenzi et al. |
| 9,154,303 B1 | 10/2015 | Saylor |
| 9,185,117 B2 | 11/2015 | Grigg et al. |
| 9,208,301 B2 | 12/2015 | Grigg et al. |
| 9,390,242 B2 | 7/2016 | Grigg et al. |
| 9,420,429 B2 | 8/2016 | Segev et al. |
| 9,525,972 B2 | 12/2016 | Raounak |
| 2013/0125231 A1 | 5/2013 | Kuenzi |
| 2015/0227926 A1 | 8/2015 | Grigg et al. |
| 2015/0244692 A1 | 8/2015 | Liu et al. |
| 2015/0350913 A1 | 12/2015 | Eberwine et al. |
| 2016/0035163 A1 | 2/2016 | Conrad et al. |
| 2016/0203315 A1* | 7/2016 | Wentz ............... G06F 21/44 726/4 |
| 2017/0093836 A1 | 3/2017 | Neafsey et al. |
| 2017/0311161 A1 | 10/2017 | Kuenzi |
| 2017/0330226 A1 | 11/2017 | Kuenzi et al. |
| 2017/0345237 A1 | 11/2017 | Kuenzi et al. |

FOREIGN PATENT DOCUMENTS

| | | |
|---|---|---|
| WO | 2017176437 A1 | 10/2017 |
| WO | 2017180388 A1 | 10/2017 |

* cited by examiner

METHOD AND SYSTEM FOR MANAGING A MULTIPLICITY OF CREDENTIALS

CROSS-REFERENCE TO RELATED APPLICATIONS

This application claims the benefit of U.S. Provisional Application No. 62/631,664 filed Feb. 17, 2018, which is incorporated herein by reference in its entirety.

BACKGROUND

The described embodiments relate generally to access control systems, and more particularly to a system for managing a multiplicity of access control credentials.

Digital credentials are used in a wide range of applications, from digital banking to access control. A credentialed user may, for instance, use a near field communication (NFC) capable smartphone to access restricted areas or company or government property, or to access digital materials to which access is similarly restricted. It is not unusual for a single user to utilize digital credentials for a wide range of different purposes and locations, and the number of such applications is likely to increase as the use of digital certificates becomes more widespread. Each credential can include or be associated with multiple permissions, so that a single credential is usable for a plurality of functions. This "federated access" approach is popular with large institutions such as governments, universities, and large corporations. For many users, however, federated access is not practical, or is not a complete solution, either because no single organization controls or manages most of that user's credentials, or because even large institutions often utilize a multitude of separate systems for different facilities or tasks.

Users who use digital credentials for a multiplicity of tasks are therefore likely to possess a large number of separate digital credentials. Some conventional systems organize all of a user's credentials in a digital wallet on a phone from which users manually select the appropriate credential for each task. This process is time consuming, particularly if users must produce credentials frequently. In addition downloading a large number of credentials can be time consuming, exhaust memory and storage, and lead to sluggish performance.

SUMMARY

A wireless key device including a wireless transceiver and antenna configured to communicate with an access terminal, and a processor configured to execute instructions to implement a method of managing digital credentials for a wireless key device. The method includes authenticating the key device with a server, retrieving a plurality of digital credentials from a server, the plurality of digital credentials associated with a plurality of access terminals within a selected geographic proximity to the key device, polling an access terminal of the plurality of access terminals via the wireless transceiver and antenna for an access terminal identification which uniquely identifies the access terminal, identifying a digital credential of the plurality of digital credentials associated with the access terminal based on the access terminal identification, and transmitting the selected digital credential to the access terminal.

In addition to one or more of the features described above, or as an alternative, further embodiments may include that the wireless transceiver and antenna are at least one of a near field communication, Bluetooth, Wi-Fi, and cellular transceiver and antenna, respectively.

In addition to one or more of the features described above, or as an alternative, further embodiments may include a display and wherein the processor is further configured to render a list of the subset of the filtered plurality of digital credentials on the display.

In addition to one or more of the features described above, or as an alternative, further embodiments may include an input device configured to receive user input and wherein the processor is further configured to receive a user input via the input device, selecting one of the subset of the filtered plurality of digital credentials.

In addition to one or more of the features described above, or as an alternative, further embodiments may include an input device configured to receive user input and wherein the processor is further configured to receive a user input via the input device, selecting the digital credential from the subset of the filtered plurality of digital credentials.

In addition to one or more of the features described above, or as an alternative, further embodiments may include that selecting the digital credential further comprises retrieving the selected credential from the server upon receiving the user input.

In addition to one or more of the features described above, or as an alternative, further embodiments may include retrieving at least one among the filtered plurality of digital credentials comprises retrieving the selected credential upon receiving the user input.

In addition to one or more of the features described above, or as an alternative, further embodiments may include that retrieving at least one among the plurality of digital credentials comprises retrieving the filtered plurality of digital credentials from a server.

In addition to one or more of the features described above, or as an alternative, further embodiments may include that the selected geographic proximity is based on a geographic location of the key device where at least one of the server receives the geographic location from the key device and the server determines the geographic location o of the key device based on information associated with communication between the key device and the server.

In addition to one or more of the features described above, or as an alternative, further embodiments may include that the processor is further configured to ascertain a geographic location of the key device via GPS.

In addition to one or more of the features described above, or as an alternative, further embodiments may include that the selected geographic proximity is at least one of a distance from the key device, a road travel distance from the key device, a zip code in the vicinity of the key device, a user defined region in proximity to the key device, and a geographic region.

Also described herein in an embodiment is a method of managing digital credentials for a wireless key device having a wireless transceiver and antenna configured to communicate wirelessly with an access terminal and a server, and a processor configured to executed instructions to implement the method. The method includes authenticating the key device with the server, retrieving a filtered plurality of digital credentials from the server, the filtered plurality of digital credentials associated with a plurality of access terminals within a selected geographic proximity to the key device, and polling the access terminal via the wireless transceiver and antenna for an access terminal identification which uniquely identifies the access terminal. The method further includes identifying a digital credential of the filtered plurality of digital credentials associated with the access terminal based on the access terminal identification, and transmitting the selected digital credential to the access terminal via the wireless transceiver and antenna.

In addition to one or more of the features described above, or as an alternative, further embodiments may include displaying a list of the at least a portion of the filtered plurality of digital credentials on a display.

In addition to one or more of the features described above, or as an alternative, further embodiments may include that receiving a user input via an input device, selecting one of the filtered plurality of digital credentials.

In addition to one or more of the features described above, or as an alternative, further embodiments may include that the retrieving a filtered plurality of digital credentials from a server comprises retrieving the selected credential upon receiving the user input.

In addition to one or more of the features described above, or as an alternative, further embodiments may include that the selected geographic proximity is based on a geographic location of the key device where at least one of the server receives the geographic location from the key device and the server determines the geographic location o of the key device based on information associated with communication between the key device and the server.

In addition to one or more of the features described above, or as an alternative, further embodiments may include that the geographic location is ascertained via GPS.

In addition to one or more of the features described above, or as an alternative, further embodiments may include that the selected geographic proximity is at least one of a distance from the key device, a road travel distance from the key device, a zip code in the vicinity of the key device, a user defined region in proximity to the key device, and a geographic region.

In addition to one or more of the features described above, or as an alternative, further embodiments may include that the polling an access terminal includes at least one of communicating with the access terminal by means of near field communication (NFC), and wherein the access terminal ID is an NFC tag, communicating with the access terminal by means of Bluetooth, communicating with the access terminal by means of Wi-Fi, and wherein the access terminal ID is a MAC address, and retrieving the access terminal ID is ascertainable from a bar code or label on the access terminal.

In addition to one or more of the features described above, or as an alternative, further embodiments may include that the access terminal directly communicates only with the key device and other key devices.

In addition to one or more of the features described above, or as an alternative, further embodiments may include the server identifying a filter based on at least a set of user permissions and the geographic location of the key device and selecting a subset of the plurality of digital credentials based on the filter.

Also described herein yet another embodiment is a user authentication system. The user authentication system includes a server having means to communicate with a key device, a key device having a wireless transceiver and antenna configured to communicate wirelessly with an access terminal The key device having a processor configured to authenticate the key device with the server, retrieve a filtered plurality of digital credentials from the server, the filtered plurality of digital credentials associated with a plurality of access terminals within a selected geographic proximity to the key device and poll an access terminal of the plurality of access terminals via the wireless transceiver and antenna for an access terminal identification which uniquely identifies the access terminal. The processor is also configured to identify a digital credential of the filtered plurality of digital credentials associated with the access terminal based on the access terminal identification and transmit the selected digital credential to the access terminal via the wireless transceiver and antenna.

In addition to one or more of the features described above, or as an alternative, further embodiments may include that the access terminal is at least one of a wireless lock, an electronic banking terminal, and a vending machine.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Embodiments herein relate generally to access controls and more specifically the automatic selection or facilitation of selection of a user credential from a set of credentials, thereby saving time and reducing complexity for the user. According to the present system, an access terminal e.g., a lock, protecting a locked space, may communicate directly with a key device, and accordingly need not be provided with any direct access to a server, or to other non-local devices to complete user access. Access is provided via a credential downloaded to a wireless key device including a wireless transceiver and antenna configured to communicate with the access terminal. The key device includes a transmitter and antennal as well as a processor that is configured to implement a method of managing digital credentials for a wireless key device. The method includes authenticating the key device with a server, the authentication including transmitting the geographic location of the key device to the server. The server then transmits a plurality of digital credentials to be retrieved by the key device. The server executes a process for identifying a plurality of digital credentials associated with a plurality of access terminals within a selected geographic proximity to the key device. The key device polls an access terminal for an access terminal identification which uniquely identifies the access terminal, and identifies a digital credential of the plurality of digital credentials associated with the access terminal based on the access terminal identification. The key device then transmits the selected digital credential to the access terminal so that a user may gain access to the locked space.

Figure 1:
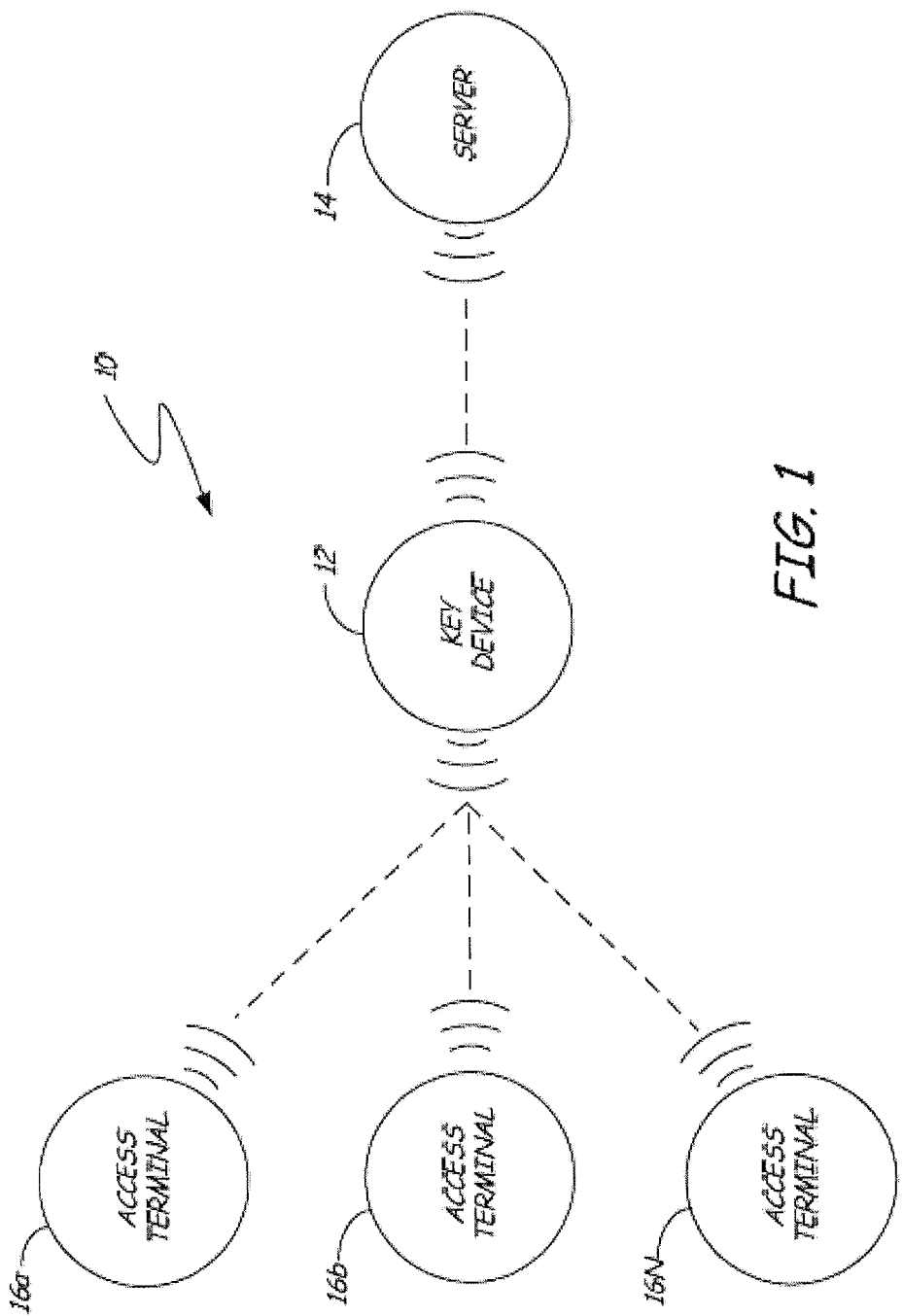
FIG. 1 is a system diagram of a user authentication system in accordance with an embodiment.

FIG. 1 is a block diagram of user authentication system 10, comprising key device 12, server 14, and a plurality of access terminals 16 (including access terminal 16a, access terminal 16b, and access terminal 16N). Key device 12 is a wireless capable handheld device such as a smartphone, smartwatch, tablet, PDA, laptop and the like, which receives digital credentials from server 14. Server 14 may also provide other data to key device 12, such as firmware or software updates. It should be appreciated that server 14 may be a plurality of server 14s that provide data separately or in conjunction with each other to key device 12. Access terminals 16 are wireless-capable restricted-access or restricted-use devices such as wireless locks, electronic banking terminals, data transfer devices, vending machines, and restricted-use machines. Key device 12 provides credentials to access terminals 16, thereby enabling a user to access or activate functions of access terminals 16. A user may, for instance, submit a digital credential to an electromechanical lock to unlock it, and thereby gain access to a restricted area. In another example, a user may submit a digital credential to an electronic banking terminal to withdraw or deposit funds, or allow access to account information. Other examples might include vending machine applications, remote sales, delivery services, and the like. Some credentials may be used for multiple access terminals 16. For instance, a plurality of electronic locks in a facility may respond to the same credential. Other credentials may be specific to a single access terminal 16. A user may utilize a large number of credentials to access the plurality of access terminals 16. To facilitate selection of appropriate credentials for each access terminal, the key device 12 is provided with a credential management system, as described with respect to FIGS. 2 and 3. A credential may be a digital certificate, an identifier, a password, an X.509 certificate, a compressed certificate, a JWT token, binary data, encoded data, or in general, data that encodes access rights that are verifiable by an access control as being authentic. Credentials may include expiration dates, access rights indicators, or any other additional data used for access control, user identification, user authentication, and so on. Data for user authentication may include biometric information, passwords, and the like. Validation of credentials may include encrypting or decrypting the credential data, verifying digital signatures, message authentication codes, or the like. It should be appreciated that any digital form of data can be used to represent a credential.

Figure 2:
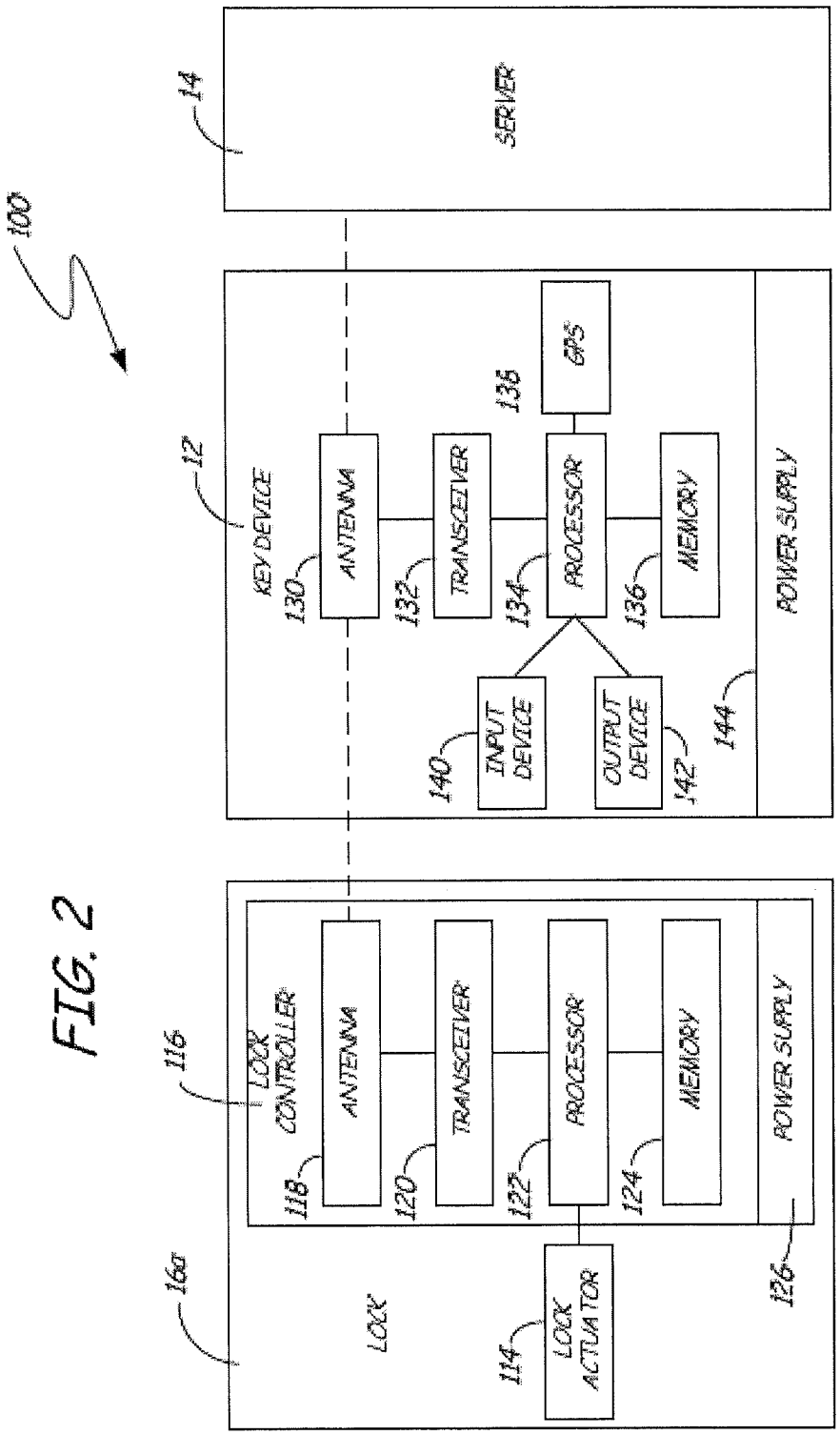
FIG. 2 is a block diagram of an electronic lock portion of the user authentication system of FIG. 1 in accordance with an embodiment.

FIG. 2 is a block diagram of electronic lock system 100, comprising lock 16a, key device 12, and server 14. Lock 16a comprises lock actuator 114, and lock controller 116 with lock antenna 118, lock transceiver 120, lock processor 122, lock memory 124, and lock power supply 126. Key device 12 comprises key antenna 130, key transceiver 132, key processor 134, key memory 136, location module 138, input device 140, output device 142, and key power supply 144.

Lock 16a is a lock responsive to digital credentials from key device 12, and is an example of one possible access terminal 16 (see FIG. 1). Lock 16a may, for instance, be the lock of a lockbox, a door lock, or a lock core. Although the present disclosure focuses primarily on digital credentials used in access control, a person skilled in the art will recognize that the described embodiments may also be applied to other systems wherein digital credentials are transmitted from a key device to a wireless terminal so as to identify the user or validate user permissions. Such systems include virtual or electronic banking systems, machine operation systems, ticketing systems, coupons, payment point of sale portals, loyalty systems, data access systems, and the like. Upon receiving and authenticating appropriate digital credentials from key device 12, lock controller 116 commands lock actuator 114 to lock or unlock a mechanical or electronic lock. Lock 16a may, for instance, be a card reader, digital lock core, keypad, or digital lock. Lock controller 116 and lock actuator 114 may be parts of a single electronic or electromechanical lock unit 16a, or may be components sold or installed separately. Lock transceiver 120 is a conventional transceiver capable of transmitting and receiving data to and from at least key device 12. Lock transceiver 120 may be a wireless type for short range or long range communication. Short range communication may include near field wireless technologies such as near field communications (NFC), Bluetooth®, Wi-Fi®, Zigbee, or the like. Lock transceiver 120 may, for instance, be a near field communication (NFC) transceiver or a Bluetooth transceiver or any suitable type for short range communication. Lock antenna 118 is an antenna appropriate to lock transceiver 120. Lock processor 122 and lock memory 124 are conventional data processing and storage devices, respectively. Lock processor 122 may, for instance, be a microprocessor. Lock power supply 126 is a power source which powers other elements of lock controller 16, and in some embodiments also powers lock actuator 114. In other embodiments, lock power supply 126 may only power lock controller 116, leaving lock actuator 114 to be powered primarily or entirely by another source, such as user work (e.g. turning a bolt). By way of example, lock power supply 126 may be a line power connection, a power scavenging system, or a battery.

Key device 12 is a wireless capable handheld device such as a smartphone, as explained above with respect to FIG. 1. Key device 12 may be a purpose built unit specifically for the application described herein or may be a general purpose device capable of running an operating system with an app and the app has the logic for handling the digital credentials. Key device 12 may be a smart phone, a tablet, a computer, a wearable device or any other type of mobile computing device. The processor 134 may run the purpose built system or operating system, etc. Key transceiver 132 is a transceiver of a type corresponding to lock transceiver 120, and key antenna 130 is a corresponding antenna. Key processor 134 is a microprocessor or analogous logic processor which handles digital credentials (again, possibly through an app), and submits these credentials to lock processor 120 via intervening antennas and transceivers 118, 120, 130, and 132. Key memory 136 is a conventional memory array wherein digital credentials are stored. Key memory 136 may be multipurpose memory available for a variety of other tasks performed by key device 12. In an embodiment, location module 138 is coupled with the key processor 134 to process location signals, and thereby determine a geographic position of key device 12. In an embodiment, location module 138 may be configured to determine positioning information indicative of a geographical position of the key device 12 using one or more positioning systems or protocols of a type well known in the art, such as Global Positioning Systems (GPS), Global Navigation System (GLONASS), Global Navigation Satellite System (GNSS), Galileo, Long Range Navigation (LORAN), National Marine Electronics Association (NMEA), Trimble Standard Interface Protocol (TSIP), DELORME® EARTHMATE®, Rockwell PLGR Protocol, iBeacon®, and SIRF®, to name a few non-limiting examples.

It will also be appreciated that the location module 138 may include local, regional, or site-wide systems of a type well known in the art, such as radio frequency identification (RFID), infrared (IR), sensor networks, Wi-Fi®-based positioning, and Ultra-Wideband (UWB) positioning systems, Bluetooth® networks, and Bluetooth® beacons, to name a few non-limiting examples. The location module 138 may work in conjunction with the process 200 of the key device 12 in determining geographic location of the key device 12. The location module 138 may be a Global Positioning System (GPS) receiver circuit, or circuitry associated with other satellite navigation systems. In any case, the location module 138 of the key device 12 can function to determine the geographic position of the key device 12. It will also be appreciated that the positioning information may include types well known in the arts such as, geographic latitude and longitude, Universal Transverse Mercator (UTM) and Universal Polar Stereographic (UPS) coordinates, stereographic coordinates, geodetic height, Cartesian coordinates, and site address, to name a few non-limiting examples.

Key processor 134 receives user input via input device 140, and provides information to users via output device 142. Input device 140 may, for instance, be a keypad or touch screen. Output device 142 may be a display, audio output, or analogous output mechanism. Key power supply 144 is a power source such as a battery, which powers all components of key device 12.

To obtain access to a region protected by lock 16a, a user must provide lock controller 116 with a valid digital credential indicating that such access is permitted. Digital credentials may be associated with individual users, or with classes of users. Each user may possess a large number of credentials for different applications, such as electronic banking and access control. Digital credentials are retrieved from server 14. In some embodiments, digital credentials are retrieved periodically or upon user request. In other embodiments, key device 12 may receive digital credentials in response to events such as entering a geographic area, or requesting access to a restricted area. At any point in time, key memory 136 may store a plurality of digital credentials, and may further store indicators that an additional plurality of digital credentials are available for retrieval from server 14. In one embodiment, processor 134 performs a credential management software method. This credential management method automatically selects a subset of these digital credentials for use, by polling lock controller 116 for an access terminal ID, and potentially also based on other information as described below with respect to FIG. 3. In another embodiment, server 14 performs a first portion of the credential management software method, providing the key device 12 with a reduced set of credentials while processor 134 performs a method of access control employing the credentials from the server. The key device automatically selects and presents the correct credential for a selected access terminal 16a-16n, by polling lock controller 116 for an access terminal ID, and potentially also based on other information as described below with respect to FIG. 4. Where the total number of digital credentials (locally stored or remotely available from server 14) is or would be, large, this certificate management method facilitates easier and faster certificate selection and provisions.

Figure 3:
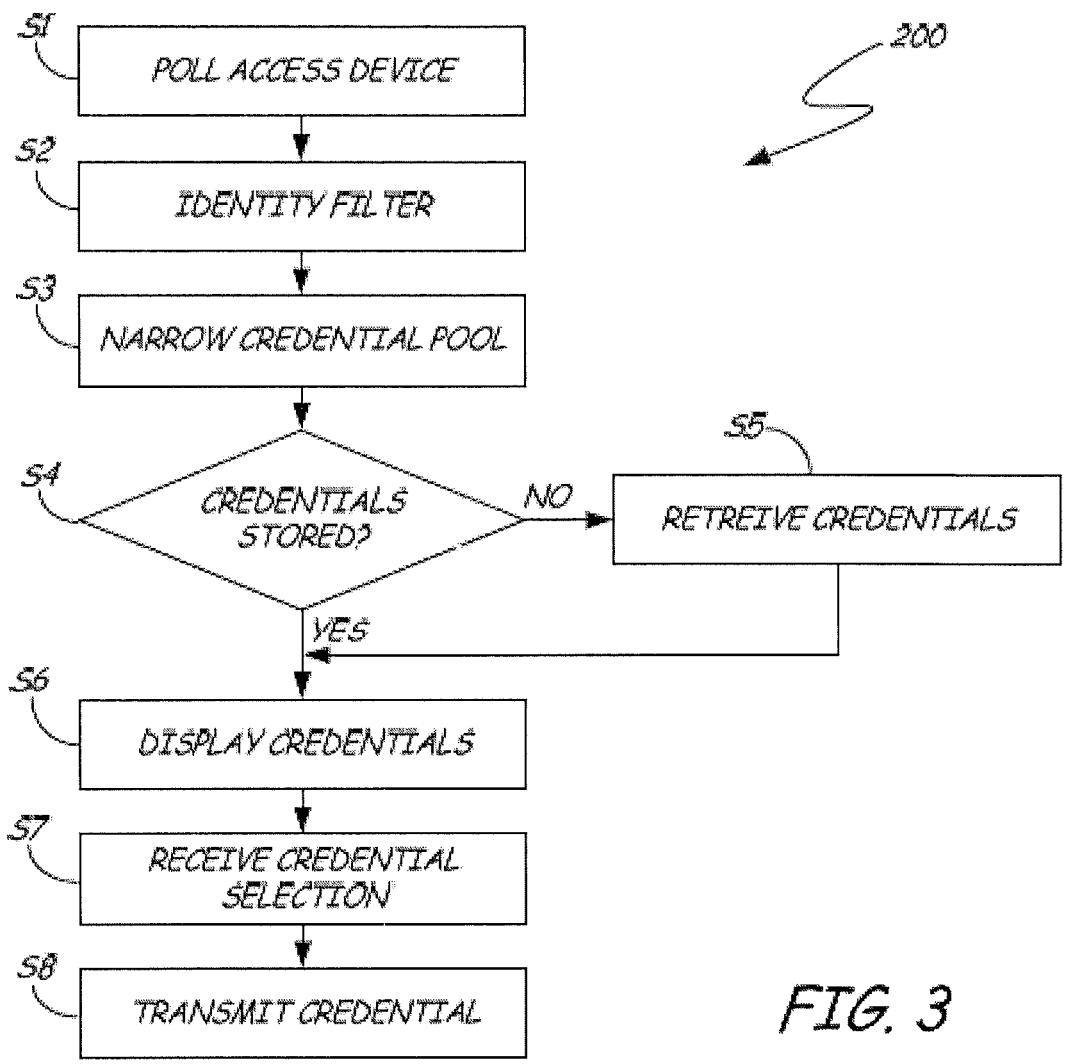
FIG. 3 is a flowchart of a credential management method performed by the user authentication system of FIG. 1 in accordance with an embodiment.

FIG. 3 is a flowchart of certificate management method 200, comprising steps S1 through S8. First, key device 12 polls an access terminal 16 (such as lock controller 116, as discussed above with respect to FIG. 2) in response to entering a geographic vicinity e.g., close proximity, of access terminal 16a, or in response to a user prompt. (Step S1). Access terminal 16a provides an access terminal ID in response to the polling from key device 12. This access terminal ID uniquely identifies the access terminal, and may be a globally unique ID (GUID) such as an IEEE defined identifier allocated by an industry intermediate party, or an ID managed by a particular organization. This access terminal ID may, for instance, be an Ethernet MAC address or Bluetooth MAC address. Each digital credential is associated, prior to use, with one or more access terminal IDs, and may contain an access terminal ID.

Access terminal 16a may be polled, and the access terminal ID retrieved, in a variety of ways, depending on the type of wireless connection available between access terminal 16a and key device 12. Where access terminal 16a and key device 12 communicate by NFC, for instance, key device 12 and access terminal 16a may both operate in peer-to-peer mode and transfer a message that contains the access terminal ID, or key device 12 may operate in reader mode while access terminal 16a operates in tag mode, functioning on induced power from key device 12, and where key device 12 reads the access terminal ID from the access terminal 16a. The access terminal ID may, for instance, be an ID read from access terminal electronics, or read from a radio-frequency identification (RFID) or NFC tag. Alternatively, key device 12 may read the access terminal ID from a bar code or label on access terminal 16b via input device 140, or receive the access terminal ID by means of manual user input via input device 140. In yet another alternative embodiment, key device 12 may communicate with access terminal 16a using Bluetooth or Wi-Fi, such that the access terminal ID is a MAC address of access terminal 16a or is a data element in a communication message. Key device 12 may communicate with each access terminal 16 via different means. In some embodiments, polling may be scanning (or listening and receiving) a Bluetooth advertisement from the access terminal 16a. In another embodiment, polling may be sending a message and receiving a response from the access terminal 16a.

Key device 12 (and particularly key processor 134) next creates or identifies a filter based on the access terminal ID (Step S2). This filter is used to define a subset of all of the user's credentials potentially applicable to access terminal 16a. (Step S3). This filter may exclude all credentials not previously associated with the access terminal ID of access terminal 16a, or may exclude only a subset of such credentials. The filtering process may include matching the access terminal ID with a data element contained within a credential. This filtering process produces a narrowed credential pool.

Processor 134 next determines whether all digital credentials in the narrowed credential pool are stored locally in key memory 136. (Step S5). If any digital credentials are missing from key memory 136, processor 134 requests these credentials from server 14 via transceiver 132 and antenna 130. Upon receiving requested credentials, or upon determining that all credentials in the narrowed credential pool are already present in key memory 136, processor 134 provides a list of all credentials in the narrowed pool via output device 142. (Step S6). Processor 134 may, for instance, render this list as a graphical list of credentials on a smartphone display, or may list credentials via an audio recitation. A user presented with such a list can select a credential from the narrowed pool via the input device, for instance by tapping on an icon representing the appropriate credential on a touch screen, or speaking the name or another identifier of the appropriate credential into a microphone. Processor 134 of key device 12 processes this user input to identify the selected credential (Step S7), and transmits the selected credential to access terminal 16.

Although the preceding description assumes that all credentials in the narrowed pool are retrieved prior to providing a user with a list of credentials in the narrowed pool via output device 142 (Step S6), this need not be the case. In some embodiments, processor 134 provides the list while some or all credentials are still missing from key memory 136, and subsequently retrieves only the digital credential identified by the user selection received in step S6. This conserves bandwidth by retrieving digital credentials from server 14 only on an as-needed basis, but correspondingly delays a user's ability to access terminal 16, since digital credentials are not retrieved ahead of time. Additionally, this alternative method may be impracticable if access terminal 16 is positioned in a location from which key device 12 cannot reliably contact server 14. Different situations may make one alternative more attractive than the other, key device 12 may utilize a mix of the two methods as appropriate. Key device 12 may, for instance, preload most long-lasting credentials, but decline to preload credentials which are infrequently used, or which frequently change (e.g. credentials which must be updated hourly). In some embodiments, processor 134 may detect that key device 12 is in the geographic vicinity of access terminal 16a from a GPS signal received via GPS receiver 138, and begin downloading the digital credential associated with access terminal 16a in response.

In many cases, the access terminal ID received in step S1 may be sufficient to uniquely identify a digital credential (i.e. if the user does not have multiple alternative digital credentials for access terminal 16a). In such cases, key device 12 may submit this (sole) digital credential in the narrowed pool to a user for validation in steps S6 and S7, or may skip steps S6 and S7 altogether.

Figure 4:
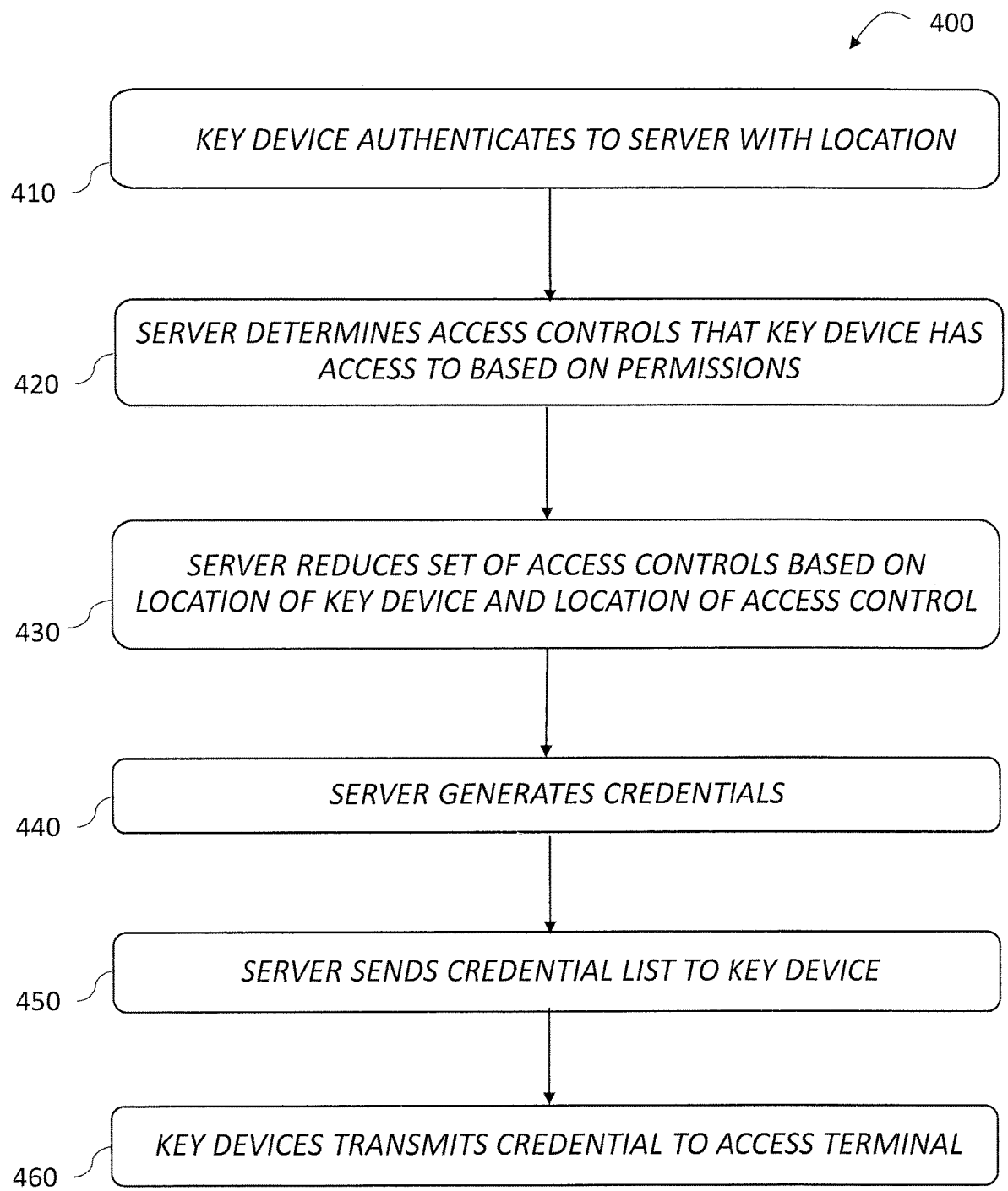
FIG. 4 is a flowchart of a credential management method performed by the user authentication system of FIG. 1 in accordance with an embodiment.

Turning now to FIG. 4, which depicts a flowchart of certificate management method 400, comprising process steps 410 through 460. In yet another embodiment, a method is disclosed for limiting the number of credentials identified as applicable to and provided to a key device 12 as a function of the geographic location of the user and the key device 12. The method 400 initiates at process step 410, the key device 12 communicates with the server 14 to provide authentication of the key device 12 to the server 14. The authentication of the key device 12 to the server 14 can be part of the communication or separate from the communication. The authentication can be, for example the key device 12 providing an identifier and password to the server 14 for a specified user account. Or the authentication can be based upon a secret shared and exchanged a priori between the key device 12 and the server 14. Or the authentication can be separate from the communication where a user account for an online identity management system can be used to then proxy authentication with the server 14. Any authentication means as understood by those skilled in the art can be used to authenticate the key device 12 to the server 14 at any time or on each communication. In an embodiment, as the key device 12 communicates and authenticates to the server 14, the key device 12 also transmits location information associated with the geographic location of the key device 12 and thereby the user. In some embodiments the transmission of the location information is implicit and the server 14 is able to determine the location of the key device 12 without the key device 12 including any data elements in the communication that indicate geographic location. For example, if the key device 12 is communicating using transceiver 132 of a type for Wi-Fi, the server 14 could determine which Wi-Fi access point the key device 12 is connected to and based upon a mapping of the access point to a location the server 14 can determine the approximate location of the key device 12. A similar determination can be done based upon cellular tower ID or cellular location triangulation if the transceiver 132 is of a cellular communications type. The determination of geographic location by the key device 12 or by the server 14 is not limited to these few examples and could utilize any means of locating a key device 12 to a relative location and mapping it to real geographic position as is well known to those skilled in the art.

Continuing with the figure, at process step 420, server 14 determines all of the access terminals 16a-16n that the key device 12 has access to, based on a user's assigned permissions. Permissions can be meta-data that is used to indicate, for example, that a user may access a certain access controlled space or entity based upon attributes such as location, function, or other well-known methods of encoding access rights to those skilled in the art of access control. Server 14 then employs the identified or determined geographic location of the key device 12, and the established permissions for the particular user and key device 12 to next create or identify a filter based on any known access terminals 16a-16n that can be identified as within a selected proximity or distance or zone of the key device 12 as shown for process step 430. The selected range may be automated for a given user or key device 12, or selectable by the user, type of key device 12, type of access terminal 16a-16n. Moreover, the selected geographic proximity may be a larger or wide definition for geographic vicinity that is in relation to the location of the key than might have been employed in process 200. The selected range may be limited by a maximum number where the nearest access terminals 16a-16n up to a maximum number. In an embodiment selected geographic proximity may include, relative to the current location of the key device 12, a distance, a road travel distance, a current zip code, a user defined region, a geographic region, a circular or multi-point geofence around the current location of key device 12 and the like. This filter is used to define a subset of all of the user's credentials to be generated or retrieved in step 440. As may readily be appreciated, the filter may exclude all credentials not previously associated with the access terminal ID of access terminal 16a, or may exclude only a subset of such credentials. So, in result, this filtering process produces a narrowed pool of potential access terminals 16a-16n, and thereby a narrowed set of credentials that are generated for the potential access terminals 16a-16n as depicted at process step 440.

Continuing with the method 400, at process step 450, server 14 next may determine whether all digital credentials in the narrowed credential pool are already stored locally in memory 136 of the key device 12. If any digital credentials are missing from key memory 136, server 14 transmits these credentials from server 14 to the processor 134 via transceiver 132 and antenna 130. In another embodiment, the server 14, may just transmit all the possible credentials in the narrowed pool to the key device 12 (as may be the case with a small number of the credentials and access terminals 16a-16n.) Upon receiving requested credentials, or upon determining that all credentials in the narrowed credential pool are already present in key memory 136, processor 134 may now utilize method 200 to present a credential to a particular access terminal 16a as shown at process step 460. It should be appreciated that process step 460, may follow immediately after process step 450 or may not be completed until sometime later. Furthermore, process steps 410 through 450 may be done at a selected first time period or instance when the key device 12 communicates with the server 14 to retrieve a fresh credential set based upon a new location or a user initiated action, for example. Moreover, process step 460 may be executed later at a second time when the key device 12 is now near a particular access terminal 16a-16n or when the user of the key device 12 indicates intent to access an access controlled space at an access terminal 16a-16n and triggers method 200 for step 460. It is also appreciated that steps 420 through 450 may involve the server 14 determining a narrowed set of credentials from different credential sources or from a set of pre-generated credentials.

In an embodiment, when a user with a key device 12 elects to procure access via a particular access terminal 16a-16n, the key device 12 may provide an inquiry and the access terminal 16a-16n provides an access terminal ID in response to the polling message from key device 12 as described above for process 200. Processor 134 of key device 12 processes this user input to identify the selected credential, and transmits the selected credential to access terminal 16a-16n so that the user can access the lock, space, and the like.

Although the preceding description assumes that all credentials in the narrowed pool are retrieved prior to providing a user with a list of credentials in the narrowed pool via output device 142, this need not be the case. In some embodiments, processor 134 provides the list while some or all credentials are still missing from key memory 136, and subsequently retrieves only the digital credential identified by a user selection. This conserves bandwidth by retrieving digital credentials from server 14 only on an as-needed basis, but correspondingly delays a user's ability to access the access terminal 16a-16n, since digital credentials are not retrieved ahead of time. Additionally, this alternative method may be impracticable if access terminal 16a-16n is positioned in a location from which key device 12 cannot reliably contact server 14. Different situations may make one alternative more attractive than the other, key device 12 may utilize a mix of the two methods as appropriate. Key device 12 may, for instance, preload most long-lasting credentials, but decline to preload credentials which are infrequently used, or which frequently change (e.g. credentials which must be updated hourly). In some embodiments, processor 134 may detect that key device 12 is in the geographic vicinity of access terminal 16a from a location signal received via location module 138, and begin downloading the digital credential associated with access terminal 16a in response.

The described embodiments allow for the automatic selection or facilitation of selection of a user credential from a set of credentials, thereby saving time and reducing complexity for the user. According to the present system, access terminal 16 may communicate directly with key device 12, and accordingly need not be provided with any direct access to server 14, or to other non-local devices.

The present disclosure may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a hard disk, a random access memory (RAM), a read-only memory (ROM), a portable compact disc (CD), a digital versatile disk (DVD), a memory stick, and the like.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers, and the like.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. The term "about" is intended to include the degree of error associated with measurement of the particular quantity based upon the equipment available at the time of filing the application. For example, "about" can include a range of ±8% or 5%, or 2% of a given value.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A wireless key device comprising:
   a wireless transceiver and antenna configured to communicate wirelessly with an access terminal and a server, wherein the server is configured to identify a filter based on at least a set of user permissions and a geographic location of the key device and select a subset of the plurality of digital credentials based on the filter; and a processor configured to:
  authenticate the key device with the server;
  retrieve the filtered plurality of digital credentials from the server, the filtered plurality of digital credentials associated with a plurality of access terminals within a selected geographic proximity to the key device;
  poll the access terminal via the wireless transceiver and antenna for an access terminal identification which uniquely identifies the access terminal;
  receive the access terminal identification from the access terminal in response to the polling from the key device;
  identify a digital credential of the filtered plurality of digital credentials associated with the access terminal based on the access terminal identification; and
  transmit the selected digital credential to the access terminal via the wireless transceiver and antenna.

2. The wireless key device of claim 1, wherein the wireless transceiver and antenna are at least one of a near field communication, Bluetooth, Wi-Fi, and cellular transceiver and antenna, respectively.

3. The wireless key device of claim 1, further including a display and wherein the processor is further configured to render a list of a subset of the filtered plurality of digital credentials on the display.

4. The wireless key device of claim 3, further including an input device configured to receive user input and wherein the processor is further configured to receive a user input via the input device, selecting the digital credential from the subset of the filtered plurality of digital credentials.

5. The wireless key device of claim 4, wherein selecting the digital credential further comprises retrieving the selected credential from the server upon receiving the user input.

6. The wireless key device of claim 1, wherein the selected geographic proximity is based on a geographic location of the key device where at least one of the server receives the geographic location from the key device and the server determines the geographic location of the key device based on information associated with communication between the key device and the server.

7. The wireless key device of claim 6, wherein the processor is further configured to ascertain the geographic location of the key device via GPS.

8. The wireless key device of claim 1, wherein the selected geographic proximity is at least one of a distance from the key device, a road travel distance from the key device, a zip code in the vicinity of the key device, a user defined region in proximity to the key device, and a geographic region.

9. A method of managing digital credentials for a wireless key device having a wireless transceiver and antenna configured to communicate wirelessly with an access terminal and a server, and a processor configured to executed instructions to implement the method, the method comprising:
  authenticating the key device with the server; identifying, using the server, a biter based on at least a set of user permissions and a geographic location of the key device and selecting a subset of the plurality of digital credentials based on the filter;
  retrieving the filtered plurality of digital credentials from the server, the filtered plurality of digital credentials associated with a plurality of access terminals within a selected geographic proximity to the key device;
  polling the access terminal via the wireless transceiver and antenna for an access terminal identification which uniquely identifies the access terminal;
  receiving the access terminal identification from the access terminal in response to the polling from the key device;
  identifying a digital credential of the filtered plurality of digital credentials associated with the access terminal based on the access terminal identification; and
  transmitting the selected digital credential to the access terminal via the wireless transceiver and antenna.

10. The method of managing digital credentials of claim 9, further comprising displaying a list of at least a portion of the filtered plurality of digital credentials on a display.

11. The method of managing digital credentials of claim 10, further comprising receiving a user input via an input device, selecting the digital credential from the portion of the filtered plurality of digital credentials.

12. The method of managing digital credentials of claim 11, further comprising wherein the selecting the digital credential further comprises retrieving the selected credential upon receiving the user input.

13. The method of managing digital credentials of claim 9, wherein the selected geographic proximity is based on a geographic location of the key device where at least one of the server receives the geographic location from the key device and the server determines the geographic location of the key device based on information associated with communication between the key device and the server.

14. The method of managing digital credentials of claim 13, wherein the geographic location is ascertained via GPS.

15. The method of managing digital credentials of claim 9, wherein the selected geographic proximity is at least one of a distance from the key device, a road travel distance from the key device, a zip code in the vicinity of the key device, a user defined region in proximity to the key device, and a geographic region.

16. The method of managing digital credentials of claim 9, wherein the polling an access terminal comprises at least one of:
  communicating with the access terminal by means of near field communication (NFC), and wherein the access terminal ID is an NFC tag;
  communicating with the access terminal by means of Bluetooth;
  communicating with the access terminal by means of Wi-Fi, and wherein the access terminal ID is a MAC address; and
  retrieving the access terminal ID is ascertainable from a bar code or label on the access terminal.

17. The method of managing digital credentials of claim 9, wherein the access terminal directly communicates only with the key device and other key devices.

18. A user authentication system comprising:
  a server having means to communicate with a key device;
  a key device having a wireless transceiver and antenna configured to communicate wirelessly with an access terminal and the server, wherein the server is configured to identify a filter based on at least a set of user permissions and a geographic location of the key device and select a subset of the plurality of digital credentials based on the filter; and the key device having:
  a processor configured to:
  authenticate the key device with the server;
  retrieve the filtered plurality of digital credentials from the server, the filtered plurality of digital credentials associated with a plurality of access terminals within a selected geographic proximity to the key device;

poll an access terminal of the plurality of access terminals via the wireless transceiver and antenna for an access terminal identification which uniquely identifies the access terminal;

receive the access terminal identification from the access terminal in response to the polling from the key device;

identify a digital credential of the filtered plurality of digital credentials associated with the access terminal based on the access terminal identification; and transmit the selected digital credential to the access terminal via the wireless transceiver and antenna.

19. The user authentication system of claim 18, wherein the access terminal is at least one of a wireless lock, an electronic banking terminal, and a vending machine.

* * * * *